(12) United States Patent
Danner et al.

(10) Patent No.: US 9,717,192 B1
(45) Date of Patent: Aug. 1, 2017

(54) FILL AND DRAIN FITTINGS FOR A HYDROPONIC FLOOD TABLE

(71) Applicants: Michael Danner, Telluride, CO (US); Steven Sawicki, Stony Brook, NY (US)

(72) Inventors: Michael Danner, Telluride, CO (US); Steven Sawicki, Stony Brook, NY (US)

(73) Assignee: Eugene G. Danner Manufacturing, Inc., Islandia, NY (US)

( * ) Notice: Subject to any disclaimer, the term of this patent is extended or adjusted under 35 U.S.C. 154(b) by 738 days.

(21) Appl. No.: 14/152,195

(22) Filed: Jan. 10, 2014

Related U.S. Application Data

(60) Provisional application No. 61/758,341, filed on Jan. 30, 2013.

(51) Int. Cl.
*A01G 31/02* (2006.01)
*E03C 1/23* (2006.01)

(52) U.S. Cl.
CPC ............ *A01G 31/02* (2013.01); *E03C 1/2306* (2013.01)

(58) Field of Classification Search
CPC .......... E03C 1/22; E03C 1/2306; A01G 31/02
USPC ........................................................ 137/593
See application file for complete search history.

(56) References Cited

U.S. PATENT DOCUMENTS

| | | |
|---|---|---|
| 518,776 A | 4/1894 | Campbell |
| 1,779,255 A | 10/1930 | Killander |
| 2,266,043 A | 12/1941 | Hutchins |
| 2,376,729 A | 5/1945 | Sherburne |
| 2,394,094 A | 2/1946 | Nichol |
| 2,454,465 A | 11/1948 | Leo et al. |
| 2,618,356 A | 11/1952 | Matheis |
| 2,885,825 A | 5/1959 | Longacre |
| 3,315,279 A | 4/1967 | Nolan |
| 3,495,280 A | 2/1970 | Galbiati |
| 3,625,310 A | 12/1971 | Herrick |
| 3,935,672 A | 2/1976 | Chatelain |
| 4,407,637 A | 10/1983 | Newby |
| 4,479,667 A | 10/1984 | Major |
| 4,976,064 A | 12/1990 | Julien |
| 7,181,782 B2 | 2/2007 | Mayer |
| 2005/0204620 A1 | 9/2005 | Butterfield et al. |

*Primary Examiner* — Robert A Hopkins
(74) *Attorney, Agent, or Firm* — Galgano IP Law PLLC; Thomas M. Galgano; Jessica G. McDonald

(57) ABSTRACT

A fill and drain fitting assembly for a hydroponic flood table having a fill fitting to permit water to be pumped into the flood table and an overflow drain fitting which is mountable in an outlet opening of the flood table. The overflow drain fitting including a housing and a strainer which is partially received within the housing. The strainer includes at least one inlet opening formed therein and is vertically adjustable within the housing to a predetermined height. The drain fitting strainer is releasably locked at the predetermined height within the drain fitting housing, to permit water in the flood table which is above the predetermined height to enter the at least one inlet opening of the strainer and exit the bottom end of the drain fitting strainer and, in turn, the bottom end of the drain fitting housing via a fluid transmission channel established therebetween.

16 Claims, 6 Drawing Sheets

FILL AND DRAIN FITTINGS FOR A HYDROPONIC FLOOD TABLE

CROSS-REFERENCE TO RELATED APPLICATION

This application claims benefit from U.S. Provisional Patent Application Ser. No. 61/758,341, filed Jan. 30, 2013, the contents of which are hereby incorporated by reference.

BACKGROUND OF THE INVENTION

1. Field of the Invention

The invention relates to fill and drain fittings which are designed to be fitted within a flood table used in hydroponic growing.

2. Brief Description of the Prior Art

In hydroponic growing operations, water is typically pumped from a reservoir into a hydroponic flood table which holds the plants. However, the water level in the flood table must not exceed a specified height, otherwise the plants within the flood table will drown and die. Therefore, a draining device must be in place to ensure that the water level does not reach unintended heights which may cause damage to the plants within the table.

However, it is desirable to be able to alter the height of the water level within the hydroponic flood table, to suit one's particular needs. Conventional prior art "fill and drain" fittings require the user to attach or detach one or more modular extensions, which are similar to plumbing couplings, in order to raise or lower a strainer on a drain fitting of the flood table, in order to adjust and maintain the desired water level.

A conventional prior art fill and drain fitting assembly includes a fill fitting assembly which allows water to be pumped into the hydroponic flood table and a drain fitting assembly which allows excess water in the flood table to drain out, so that the plants do not drown. Particularly, the conventional prior art drain fitting assemblies include a strainer and one or more modular couplings disposed beneath the strainer. The modular couplings are fitted into the drain fitting and stacked atop of each other, in order to determine the water level at which the flood table will start to drain. A strainer is received on top of the one or more modular couplings and secured via a friction fit, in order to drain water which is above the water level set by the modular couplings. However, it is advantageous to provide a drain fitting which is simpler than the prior art arrangements and eliminates the need for a plurality of modular couplings to adjust the water level in the hydroponic flood table.

While the prior art discloses many types of fill and drain fitting assemblies, so far as is known, none of these assemblies resolve these problems in a simple, effective and highly advantageous manner, as in the present invention.

SUMMARY OF THE INVENTION

It is therefore an object of the present invention to provide a novel fill and drain fitting assembly for a hydroponic flood table.

It is also an object of the present invention to provide a fill and drain fitting assembly which eliminates the need for one or more modular couplings used in the existing prior art systems to raise and lower the desired water level in hydroponic flood tables.

It is another object of the present invention to provide a fill and drain fitting assembly which is simpler and easier to use than the prior art assemblies.

Certain of the foregoing and related objects are readily attained according to the present invention by the provision of an overflow drain fitting mountable in a hydroponic flood table of the type having a base wall with an outlet opening formed therein, comprising a generally tubular housing mountable in the outlet opening of the flood table, said housing having an open top end, an opposite open bottom end, and a housing channel defined and extending between said top end and said bottom end; a strainer which is configured and dimensioned to be at least partially received within said housing channel via said open top end, such that a portion of said strainer projects upwardly from said top end of said housing, said strainer having a generally tubular body with an open bottom end, an opposite top end, and at least one inlet opening formed in said body, wherein said strainer is vertically adjustable within said housing channel to a predetermined height, and wherein when said strainer is received within said housing, a fluid transmission channel is established for fluid communication between and through said at least one inlet opening of said strainer, said bottom end of said strainer, and said bottom end of said housing; and means for releasably locking said strainer at said predetermined height within said housing, to permit water in the flood table which is above said predetermined height to enter said at least one inlet opening of said strainer and exit said bottom end of said strainer and, in turn, said bottom end of said housing via said fluid transmission channel.

Preferably, said strainer is telescopically received and adjustable within said housing channel. In the preferred embodiment, said means for releasably locking said strainer comprise friction fit means. More particularly, in the preferred embodiment, said friction fit means comprises one of said housing and said strainer comprising at least one longitudinally extending groove formed therein; and the other of said housing and said strainer comprising at least one longitudinally extending and outwardly projecting rib formed thereon which is configured and dimensioned to be received within said at least one groove, and wherein said strainer and said housing are rotatable with respect to one another such that said at least one rib travels out of said at least one groove and is held by a friction fit, for maintaining said strainer at said predetermined height.

Advantageously, four grooves are formed in said housing and are spaced approximately 90° apart and four ribs are formed in said strainer and are spaced approximately 90° apart. Desirably, said strainer comprises a plurality of inlet openings formed in an upper portion thereof.

Additionally, in the preferred embodiment, said housing further comprises an outwardly extending flange on said top end, to secure said housing to the base wall of the flood table. It is also desirable that the fitting further comprises an internally threaded locking nut, and wherein said housing has an outer surface, at least a portion of which is externally threaded for engagement with said locking nut to secure said housing to the base wall of the flood table. Preferably, the bottom end of said housing is barbed.

Certain of the foregoing and related objects are readily attained according to the present invention by the provision of a fill and drain fitting assembly for a hydroponic flood table of the type having a base wall with an outlet opening formed therein, comprising a fill fitting, to permit water to be pumped in through said fill fitting and exit said fill fitting into the flood table; and an overflow drain fitting mountable in the outlet opening of the flood table, comprising, a generally tubular drain fitting housing having an open top end, an opposite open bottom end, and a drain fitting housing channel defined and extending between said top end and said bottom end; a drain fitting strainer which is configured and dimensioned to be at least partially received within said drain fitting housing channel via said open top end, such that a portion of said drain fitting strainer projects upwardly from said top end of said drain fitting housing, said drain fitting strainer having a generally tubular body with an open bottom end, an opposite top end, and at least one inlet opening formed in said body, wherein said drain fitting strainer is vertically adjustable within said drain fitting housing channel to a predetermined height, and wherein when said drain fitting strainer is received within said drain fitting housing, a fluid transmission channel is established for fluid communication between and through said at least one inlet opening of said drain fitting strainer, said bottom end of said drain fitting strainer, and said bottom end of said drain fitting housing; and means for releasably locking said drain fitting strainer at said predetermined height within said drain fitting housing, to permit water in the flood table which is above said predetermined height to enter said at least one inlet opening of said drain fitting strainer and exit said bottom end of said drain fitting strainer and, in turn, said bottom end of said drain fitting housing via said fluid transmission channel.

Furthermore, it is preferred that said fill fitting comprises a generally tubular fill fitting housing having an open top end, an opposite open bottom end, and a fill fitting housing channel defined and extending between said top end and said bottom end; and a fill fitting strainer which is configured and dimensioned to be at least partially received within said fill fitting housing channel via said open top end, such that a portion of said fill fitting strainer projects upwardly from said top end of said fill fitting housing, said fill fitting strainer having a generally tubular body with an open bottom end, an opposite top end, and at least one outlet opening formed in said body, and wherein when said fill fitting strainer is received within said fill fitting housing channel, a fluid transmission channel is established for fluid communication between and through said bottom end of said fill fitting housing, said bottom end of said fill fitting strainer, and said at least one outlet opening of said fill fitting strainer.

Advantageously, said drain fitting strainer is telescopically received and adjustable within said drain fitting housing channel. In the preferred embodiment, said means for releasably locking said drain fitting strainer comprise friction fit means. More particularly, it is preferable that said friction fit means comprises one of said drain fitting housing and said drain fitting strainer comprising at least one longitudinally extending groove formed therein; and the other of said drain fitting housing and said drain fitting strainer comprising at least one longitudinally extending and outwardly projecting rib formed thereon which is configured and dimensioned to be received within said at least one groove, and wherein said drain fitting strainer and said drain fitting housing are rotatable with respect to one another such that said at least one rib travels out of said at least one groove and is held by a friction fit, for maintaining said drain fitting strainer at said pre-determined height.

Advantageously, said fill fitting strainer comprises a plurality of outlet openings formed in an upper portion thereof and said drain fitting strainer comprises a plurality of inlet openings formed in an upper portion thereof. Preferably, said drain fitting housing and said fill fitting housing each further comprise an outwardly extending flange on said respective top ends, to secure said drain fitting housing and said fill fitting housing to the base wall of the flood table. It is also preferred that the assembly further comprises an internally threaded locking nut, and wherein said drain fitting housing and said fill fitting housing each have an outer surface, at least a portion of which is externally threaded for engagement with said locking nut to secure said housing to the base wall of the flood table.

Desirably, said bottom end of said fill fitting housing and said drain fitting housing are barbed. Furthermore, it is advantageous that said barbed bottom end of said drain fitting housing has a diameter which is greater than the diameter of said barbed bottom end of said fill fitting housing. Advantageously, one of said fill fitting housing and said fill fitting strainer comprise at least one longitudinally extending groove formed therein; and the other of said fill fitting housing and said fill fitting strainer comprise at least one longitudinally extending and outwardly projecting rib formed thereon which is configured and dimensioned to be received within said at least one groove.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED EMBODIMENTS

Figure 1:
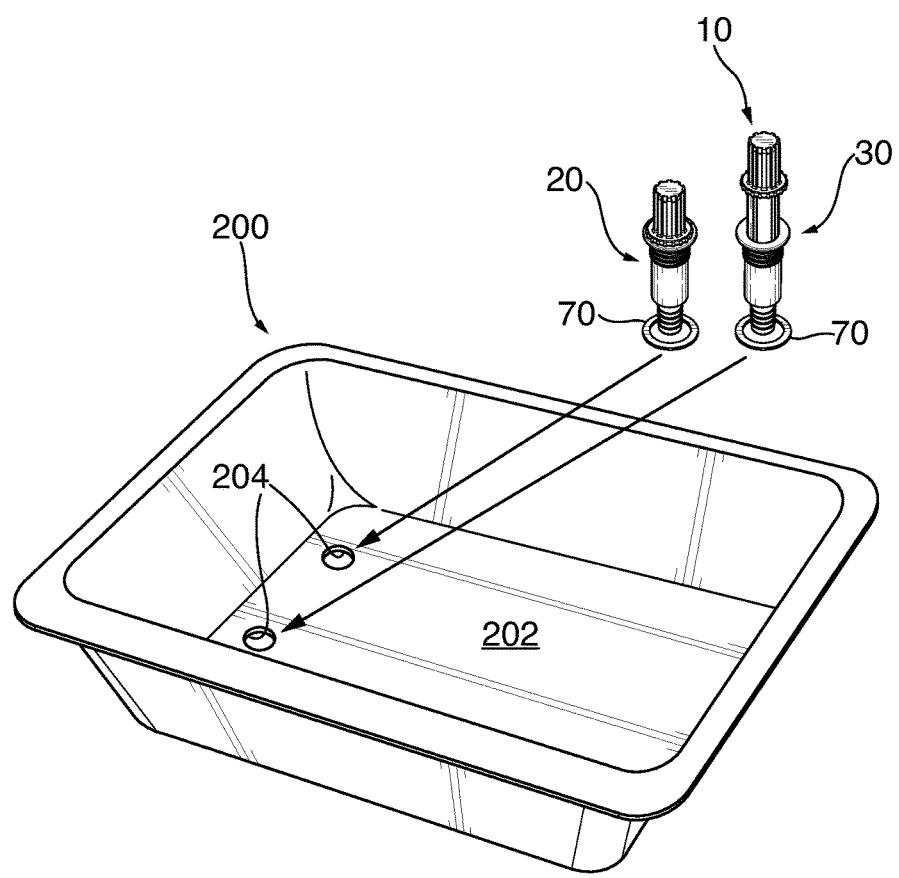
FIG. 1 is a perspective view of a hydroponic flood table having openings therein for the fill and drain fittings according to the present invention.

Turning now in detail to the drawings and, in particular, FIG. 1, which illustrates the fill and drain fitting assembly of the present invention, generally designated by reference numeral 10, shown mounted in a conventional hydroponic flood table 200. More particularly, as illustrated in FIG. 1, the fill and drain fitting assembly 10 of the present invention comprises a fill fitting assembly, generally designated by reference numeral 20 and a drain fitting assembly, generally designated by reference numeral 30. As seen in FIG. 1, a conventional hydroponic flood table 200 has a base wall 202 having two openings 204 defined therein. As seen best in FIGS. 1 and 2, fill fitting assembly 20 and drain fitting assembly 30 are each received within one of the openings 204 and are mountable to the base wall 202 of the flood table 200.

Figure 2:
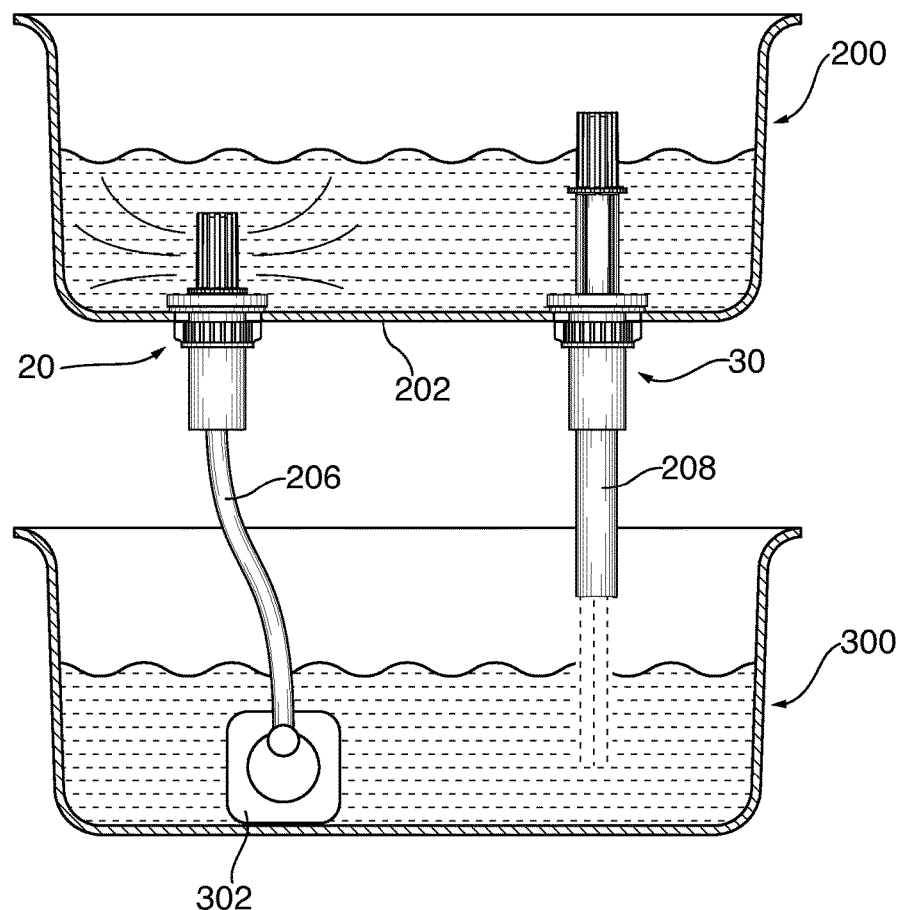
FIG. 2 is an elevational view of a hydroponic flood table having the fittings of the present invention received therein, and which is connected to a reservoir.

As shown in FIG. 2, the hydroponic flood table 200 is utilized in combination with a conventional reservoir 300 which is located at a position lower than flood table 200. Reservoir 300 typically includes a water pump 302 which is connected by a tube 206 to the fill fitting assembly 20 in order to pump water from the reservoir 300 into flood table 200. As water is pumped from the reservoir 300 into the flood table 200, it reaches a pre-determined level within the flood table 200. It is important that the water not exceed a desired level, to prevent the plants (not shown) held within the hydroponic flood table 200 from being drowned. Therefore, the drain fitting assembly 30 is utilized to drain water which is above the pre-determined height in the flood table 200 into the reservoir 300 via a tube 208. Tube 208 is optional and can be utilized to prevent splashing.

More particularly, as illustrated in FIG. 2, the fill fitting assembly 20 permits water to be pumped in from reservoir 300 via tube 206 and exit into the flood table 200. As shown best in FIG. 3, fill fitting assembly 20 comprises a generally tubular housing 40a. As seen in FIG. 4, housing 40a has an open top end 41a, an opposite open bottom end 42a, and a channel 43a defined and extending between top end 41a and bottom end 42a. Preferably, bottom end 42a is smaller in diameter than the body of the housing 40a and is barbed for attachment to a conventional flexible tube 206, to allow water to be pumped into the flood table 200 from the reservoir 300 (see, FIG. 2). The barbed bottom end 42a preferably has a diameter of ½", ¾" or 1", to allow for the attachment of standard ½", ¾" or 1" diameter flexible tubing, respectively.

Figure 3:
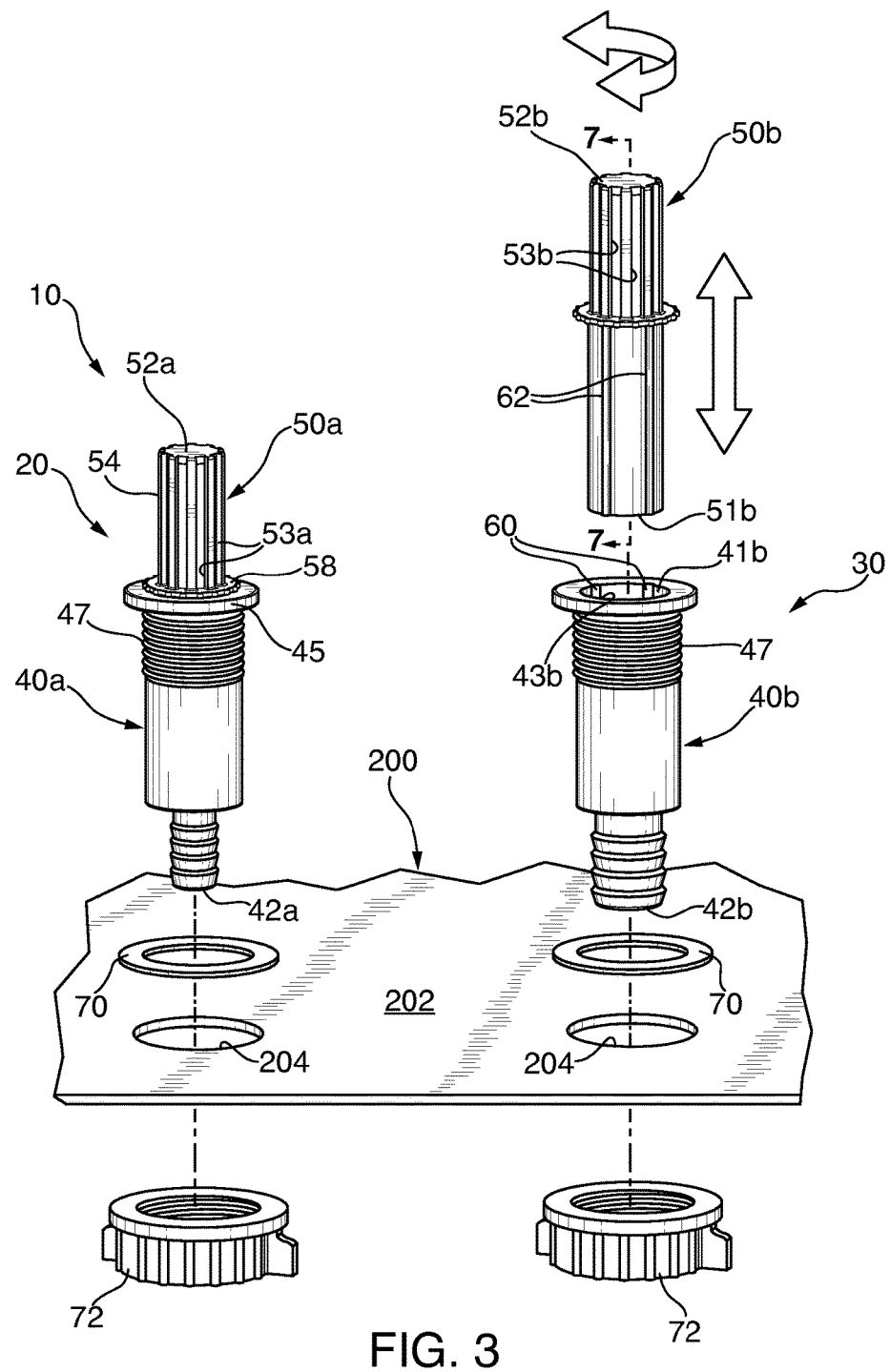
FIG. 3 is a partially exploded view of the fill and drain fittings according to the present invention relative to the base wall of the hydroponic flood table.
Figure 4:
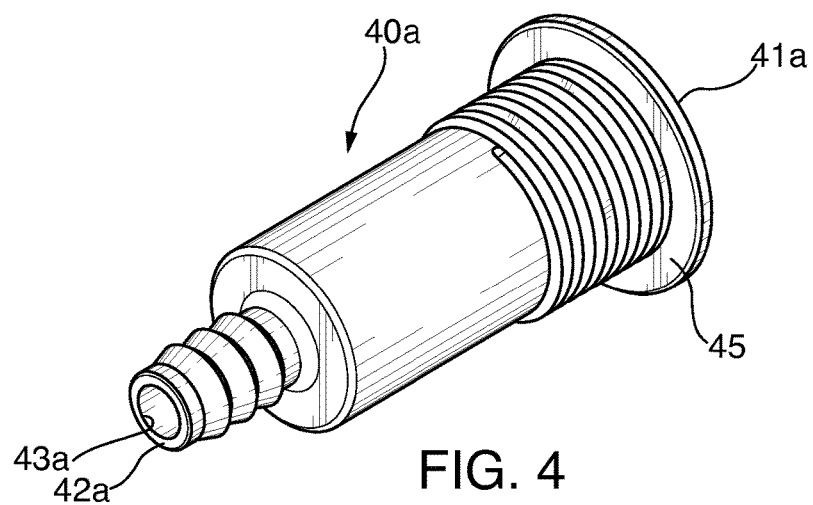
FIG. 4 is a bottom and side perspective view of the fill fitting housing according to the present invention.

As also shown in FIG. 3, fill fitting assembly 20 also includes a strainer 50a which is configured and dimensioned to be at least partially received within channel 43a of fill fitting housing 40a via open top end 41a. Particularly, as illustrated in FIG. 3, strainer 50a is telescopically received within housing 40a. When strainer 50a is received in fill fitting housing 40a, as shown in FIG. 3, an upper portion 54 of strainer 50a projects upwardly from top end 41a of said fill fitting housing 40a.

Figure 7:
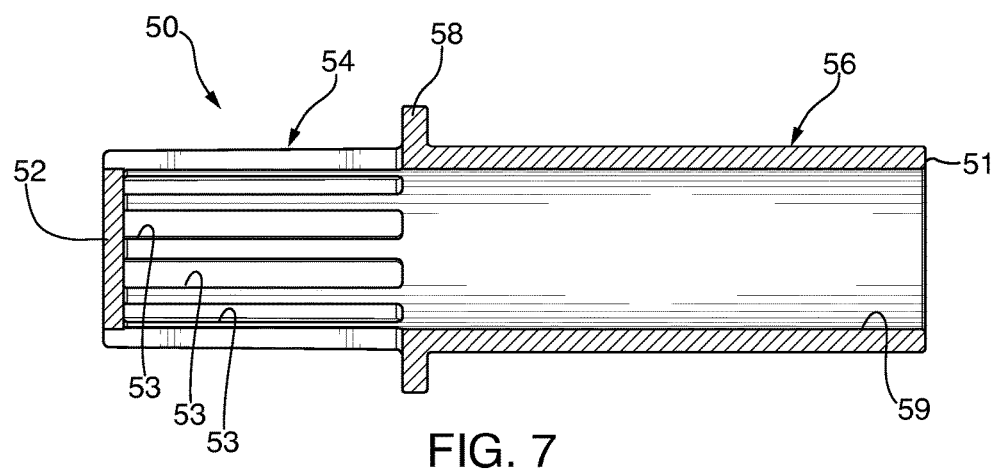
FIG. 7 is a cross-sectional view of the strainer along line 7-7 in FIG. 3.

Strainer 50a in fill fitting housing and strainer 50b in drain fitting housing have the same construction. The various components of the strainer are designated with an "a" or "b" after the reference number with the elements containing an "a" after the reference number referring to the fill fitting housing, with a "b" referring to the drain fitting housing, and without an "a" or "b" referring to both strainers. The same designations with an "a" or a "b" being the same for other elements of the present invention. As shown in FIGS. 3 and 7, strainers 50 each have a generally tubular body with an open bottom end 51, an opposite top end 52, and at least one opening 53 formed therein. Preferably, a plurality of openings 53 in the form of vertical slots are provided on strainer 50. A channel 59 is formed in strainer 50 for fluid communication between bottom end 51 and openings 53. FIG. 7 shows the channel 59 formed within strainer 50 to allow fluid communication between openings 53 and bottom end 51. In the preferred embodiment, strainer 50 is divided into an upper portion 54 and a lower portion 56 via an outwardly extending flange 58. The outlet openings 53 are disposed on upper portion 54, as seen best in FIG. 7. When strainers 50 are fully received within housings 40a or 40b, respectively, flange 58 rests against top end 41 of housings 40.

In fill fitting strainer 50a, slots 53a allow the water pumped in from reservoir 300 to exit into flood table 200. It is preferable that the top end 52a of the strainer 50a is closed to prevent vertical discharge of water into the flood table 200. Instead, in fill fitting strainer 50a, since the top end 52 is closed, the water is discharged horizontally into the flood table 200 via the outlets 53a.

As seen in FIG. 3, when strainer 50a is received within channel 43a of fill fitting housing 40a, a fluid transmission channel 59 is established for fluid communication between and through bottom end 42a of fill fitting housing 40a, bottom end 51 of fill fitting strainer 50a, and openings 53a of fill fitting strainer 50a. Particularly, water enters the bottom end 42a of fill fitting 40a, and flows into the open bottom end 51 of the strainer 50a and, in turn, travels through channel 59 and exits into the flood table 200 via the outlet openings 53a in the strainer 50a.

Figure 5:
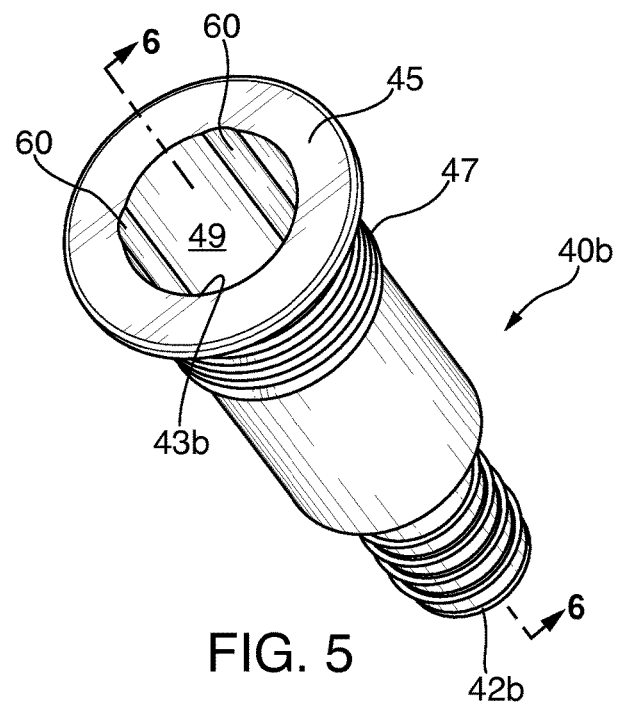
FIG. 5 is a top and side perspective view of the drain fitting housing according to the present invention.
Figure 6:
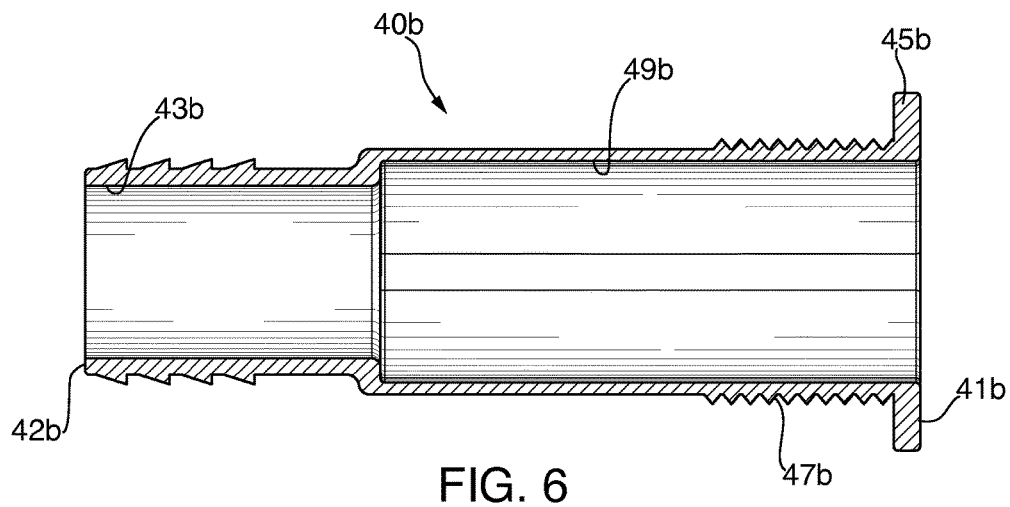
FIG. 6 is a cross-section view of the drain fitting housing along line 6-6 in FIG. 5.

As seen in FIG. 3, the fill and drain fitting assembly 10 also includes a drain fitting assembly 30 which comprises a drain fitting housing 40b and a drain fitting strainer 50b received therein. Drain fitting housing 40b and drain fitting strainer 50b have the same construction as the fill fitting housing 40a and fill fitting strainer 50a, respectively, except that the drain fitting housing 40b has a wider diameter barbed bottom end 42b than end 42a fill fitting housing 40a. The drain fitting assembly 30 is utilized to drain water which is disposed above a desired height in flood table 200, back into reservoir 300 (see, FIG. 2). As shown best in FIGS. 5 and 6, drain fitting assembly 30 comprises a generally tubular housing 40b having an open top end 41b, an opposite open bottom end 42b, and a channel 43b defined and extending between top end 41b and bottom end 42b. Preferably, bottom end 42b is smaller in diameter than the body of housing 40b and is barbed for attachment to tube 208, to allow water to drain into reservoir 300. The barbed bottom end 42b preferably has a diameter of ½", ¾" or 1" to allow for the attachment of standard ½", ¾" and 1" diameter flexible tubing, respectively. However, the diameter of the barbed bottom end 42b of the drain fitting housing 40b, as shown in FIGS. 5 and 6, must always be larger than the bottom end 42a of the fill fitting housing 40a, as shown in FIG. 4, to prevent any overflow condition of the hydroponic flood table.

As shown in FIGS. 3 and 7, drain fitting assembly 30 also includes a strainer 50b which is configured and dimensioned to be at least partially received within channel 43b of drain fitting housing 40b via open top end 41b. Particularly, strainer 50b is telescopically received and adjustable within housing 40b, to set a desired height of strainer 50b. When strainer 50b is received in the drain fitting housing 40b, an upper portion of 54 strainer 50b projects upwardly from top end 41b of drain fitting housing 40b.

As seen in FIGS. 2-3 and 7, a plurality of inlet openings 53b in the form of vertical slots are provided on drain fitting strainer 50b, to allow the water which is at or above the height of the inlet openings 53b, to drain from the flood table 200, back into reservoir 300, via tube 208. More particularly, when drain fitting strainer 50b is received within channel 43b of drain fitting housing 40b, a fluid transmission channel 59b is established for fluid communication between and through inlet openings 53b of strainer 50b, bottom end 51b of strainer 50b, and bottom end 42b of drain fitting housing 40b.

Figure 8:
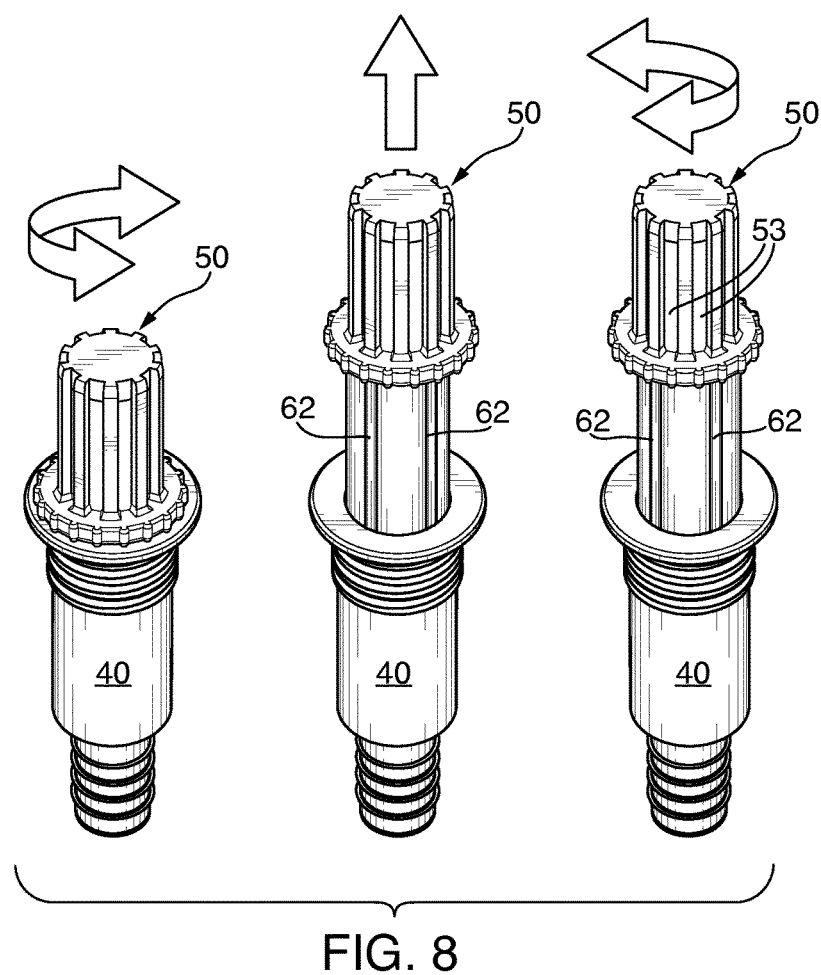
FIG. 8 is a series of views of the strainer and housing of the drain fitting assembly, illustrating the telescopic and rotational locking of the strainer within the housing.

As best illustrated in FIGS. 3 and 8, the drain fitting assembly 30 also includes means for releasably locking the drain fitting strainer 50b at a predetermined height within drain fitting housing 40b, and, in turn, within flood table 200, in order to permit water in flood table 200 which is at or above the predetermined desired height to enter the inlet openings 53b of strainer 50b and exit the bottom end 51b of strainer 50b and, in turn, bottom end 42b of drain fitting housing via a fluid transmission channel 59 established therebetween. The water then exits bottom end 42b and drains into reservoir 300 via tube 208.

Particularly, the means for releasably locking strainer 50b comprise friction fit means. More particularly, as seen best in FIG. 5, in relation to housing 40, housing 40b contains longitudinally extending grooves 60 formed therein which extend downwardly from top end 41. Housing 40a is constructed the same as housing 40b except that it has a smaller diameter bottom end 42a and, therefore, can also contain grooves 60. Preferably, four grooves 60 are formed in housing 40 and are spaced approximately 90° apart. Furthermore, as seen in FIG. 3, strainer 50 includes longitudinally extending and outwardly projecting ribs 62 formed thereon. Preferably, four ribs 62 are formed on strainer 50 and are spaced apart approximately 90°. It is also preferred that the ribs 62 extend the entire length from flange 58 to bottom end 51 and are disposed on the lower portion 56 of strainers 50. It can be appreciated that at least one rib and groove are provided or any other suitable number of corresponding grooves and ribs.

Ribs 62 on strainers 50 are configured and dimensioned to be received within the corresponding grooves 60 on housings 40a and 40b. As seen in FIGS. 3 and 8, the strainers 50a and 50b are able to slide into the housings 40a and 40b, respectively, with the ribs 62 received within the corresponding grooves 60.

In the drain fitting assembly 30, as seen in FIGS. 3 and 8, ribs 62 and grooves 60 are utilized in order to set the vertical height of the strainer 50b in relation to the drain fitting housing 40b. The strainer 50 in drain fitting assembly 30 is slidably and vertically telescopically adjustable within housing 40 to a desired height, without the need for modular coupling, as in the prior art assemblies. As illustrated in FIG. 8, once the desired height is reached, strainer 50 is rotatable with respect housing 40 so that ribs 62 on the strainer 50 travel out of grooves 60 on housing 40 and the ribs 62 are held by a friction fit against the inner cylindrical surface 49 of housing 40b (see FIG. 5), for maintaining strainer 50 at the predetermined height. However, it can be appreciated that housings 40 may have outwardly projecting ribs and strainers 50 have corresponding grooves formed therein.

The desired water level is maintained within the flood table 200 because water which is at or above the height of the inlet opening 53b in drain fitting strainer 50b, which has been adjusted to the desired height, drains out from the flood table 200. Particularly, the water enters inlet openings 53b in strainer 50b, and exits the open bottom end 51b of strainer 50b and, in turn, the open bottom end 42b of drain fitting housing 40b.

Housings 40a and 40b each further include an outwardly extending flange 45 on top ends 41a and 41b, respectively, to secure housings 40a and 40b to the base wall 202 of the flood table 200. Particularly, as seen in FIG. 2, when housings 40a and 40b are inserted through the openings 204 formed in the base wall 202 of the flood table 200, the flanges 45 abut and rest against the base wall 202 to prevent the housings 40a and 40b from falling through the flood table 200. To further secure the housings 40a and 40b each of the housings have an externally threaded portion 47 which is disposed beneath the outwardly extending flanges 45. Preferably, a washer 70 is disposed beneath the flanges 45 and above the base wall 202 of the flood table 200, to prevent leakage and provide a water tight seal. An internally threaded locking nut 72 engages with each of the externally threaded portions 47 on the outer surfaces of housings 40a and 40b to secure the housings 40a and 40b to the flood table 200.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. An overflow drain fitting mountable in a hydroponic flood table having a base wall with an outlet opening formed therein, comprising:
   a generally tubular housing mountable in the outlet opening of the flood table, said housing having an open top end, an opposite open bottom end, and a housing channel defined and extending between said top end and said bottom end;
   a strainer which is configured and dimensioned to be at least partially received within said housing channel via said open top end, such that a portion of said strainer projects upwardly from said top end of said housing, said strainer having a generally tubular body with an open bottom end, an opposite top end, and at least one inlet opening formed in said body, wherein said strainer is vertically adjustable within said housing channel to a predetermined height, and wherein when said strainer is received within said housing, a fluid transmission channel is established for fluid communication between and through said at least one inlet opening of said strainer, said bottom end of said strainer, and said bottom end of said housing; and
   friction fit means for releasably locking said strainer at said predetermined height within said housing, to permit water in the flood table which is above said predetermined height to enter said at least one inlet opening of said strainer and exit said bottom end of said strainer and, in turn, said bottom end of said housing via said fluid transmission channel, wherein said means for releasably locking said strainer comprises one of said housing and said strainer comprising at least one longitudinally extending groove formed therein; and the other of said housing and said strainer comprising at least one longitudinally extending and outwardly projecting rib formed thereon which is configured and dimensioned to be received within said at least one groove, and wherein said strainer and said housing are rotatable with respect to one another such that said at least one rib travels out of said at least one groove and is held by a friction fit, for maintaining said strainer at said predetermined height.

2. The fitting according to claim 1, wherein:
   said strainer is telescopically received and adjustable within said housing channel.

3. The fitting according to claim 1, wherein:
   four grooves are formed in said housing and are spaced approximately 90° apart and four ribs are formed in said strainer and are spaced approximately 90° apart.

4. The fitting according to claim 1, wherein:
   said strainer comprises a plurality of inlet openings formed in an upper portion thereof.

5. The fitting according to claim 1, wherein:
   said housing further comprises an outwardly extending flange on said top end, to secure said housing to the base wall of the flood table.

6. The fitting according to claim 5, further comprising:
an internally threaded locking nut, and wherein said housing has an outer surface, at least a portion of which is externally threaded for engagement with said locking nut to secure said housing to the base wall of the flood table.

7. The fitting according to claim 1, wherein:
said bottom end of said housing is barbed.

8. A fill and drain fitting assembly for a hydroponic flood table having a base wall with an outlet opening formed therein, comprising:
a fill fitting, to permit water to be pumped in through said fill fitting and exit said fill fitting into the flood table; and
an overflow drain fitting mountable in the outlet opening of the flood table, comprising,
a generally tubular drain fitting housing having an open top end, an opposite open bottom end, and a drain fitting housing channel defined and extending between said top end and said bottom end;
a drain fitting strainer which is configured and dimensioned to be at least partially received within said drain fitting housing channel via said open top end, such that a portion of said drain fitting strainer projects upwardly from said top end of said drain fitting housing, said drain fitting strainer having a generally tubular body with an open bottom end, an opposite top end, and at least one inlet opening formed in said body, wherein said drain fitting strainer is vertically adjustable within said drain fitting housing channel to a predetermined height, and wherein when said drain fitting strainer is received within said drain fitting housing, a fluid transmission channel is established for fluid communication between and through said at least one inlet opening of said drain fitting strainer, said bottom end of said drain fitting strainer, and said bottom end of said drain fitting housing; and
friction fit means for releasably locking said drain fitting strainer at said predetermined height within said drain fitting housing, to permit water in the flood table which is above said predetermined height to enter said at least one inlet opening of said drain fitting strainer and exit said bottom end of said drain fitting strainer and, in turn, said bottom end of said drain fitting housing via said fluid transmission channel, wherein said means for releasably locking said strainer comprises one of said drain fitting housing and said drain fitting strainer comprising at least one longitudinally extending groove formed therein; and the other of said drain fitting housing and said drain fitting strainer comprising at least one longitudinally extending and outwardly projecting rib formed thereon which is configured and dimensioned to be received within said at least one groove, and wherein said drain fitting strainer and said drain fitting housing are rotatable with respect to one another such that said at least one rib travels out of said at least one groove and is held by a friction fit, for maintaining said drain fitting strainer at said pre-determined height.

9. The assembly according to claim 8, wherein:
said fill fitting comprises a generally tubular fill fitting housing having an open top end, an opposite open bottom end, and a fill fitting housing channel defined and extending between said top end and said bottom end; and
a fill fitting strainer which is configured and dimensioned to be at least partially received within said fill fitting housing channel via said open top end, such that a portion of said fill fitting strainer projects upwardly from said top end of said fill fitting housing, said fill fitting strainer having a generally tubular body with an open bottom end, an opposite top end, and at least one outlet opening formed in said body, and wherein when said fill fitting strainer is received within said fill fitting housing channel, a fluid transmission channel is established for fluid communication between and through said bottom end of said fill fitting housing, said bottom end of said fill fitting strainer, and said at least one outlet opening of said fill fitting strainer.

10. The assembly according to claim 8, wherein:
said drain fitting strainer is telescopically received and adjustable within said drain fitting housing channel.

11. The assembly according to claim 9, wherein:
said fill fitting strainer comprises a plurality of outlet openings formed in an upper portion thereof and said drain fitting strainer comprises a plurality of inlet openings formed in an upper portion thereof.

12. The assembly according to claim 9, wherein:
said drain fitting housing and said fill fitting housing each further comprise an outwardly extending flange on said respective top ends, to secure said drain fitting housing and said fill fitting housing to the base wall of the flood table.

13. The assembly according to claim 12, further comprising:
an internally threaded locking nut, and wherein said drain fitting housing and said fill fitting housing each have an outer surface, at least a portion of which is externally threaded for engagement with said locking nut to secure said housing to the base wall of the flood table.

14. The assembly according to claim 9, wherein:
said bottom end of said fill fitting housing and said drain fitting housing are barbed.

15. The assembly according to claim 14, wherein:
said barbed bottom end of said drain fitting housing has a diameter which is greater than the diameter of said barbed bottom end of said fill fitting housing.

16. The assembly according to claim 9, wherein:
one of said fill fitting housing and said fill fitting strainer comprise at least one longitudinally extending groove formed therein; and
the other of said fill fitting housing and said fill fitting strainer comprise at least one longitudinally extending and outwardly projecting rib formed thereon which is configured and dimensioned to be received within said at least one groove.

* * * * *